Patented June 6, 1933

1,912,833

UNITED STATES PATENT OFFICE

ANDREW MILLER FAIRLIE, OF ATLANTA, GEORGIA

METHOD OF SEPARATING NITROGEN OXIDES FROM A GAS MIXTURE CONTAINING THE SAME

No Drawing.    Application filed December 19, 1927.    Serial No. 241,260.

This invention relates particularly, but not exclusively, to the gases of nitration-process sulfuric acid plants, and its object is to effect a more complete recovery of oxides of nitrogen, economically and in a form available for re-use, from a gas mixture containing those oxides, than has been practicable heretofore.

In my Patent No. 1,205,723, I pointed out the desirability of having, in the chamber exit gases of a sulfuric acid plant, a small percentage of residual $SO_2$, usually from .05 to .15 per cent by volume, in order to facilitate the absorption of nitrogen oxides in sulfuric acid of around 60° Bé. in strength. By means of the methods disclosed in said patent, I was able to effect an average recovery of about 87 per cent of the nitrogen compounds used in the manufacture of sulfuric acid. In my Patent 1,420,477, reissued as Reissue 16,709, I showed the necessity of removing or oxidizing practically all of the $SO_2$, if the nitrogen oxides, or part of them, were to be absorbed in water, and I there indicated, as illustrations, four methods by which the residual $SO_2$ might be removed or oxidized. One of these methods was by oxidation with a chemical oxidation agent. One of the best chemical oxidizing agents for the prompt oxidation of the residual $SO_2$ is nitric acid, and the use of nitric acid for this purpose forms the basis of my co-pending application No. 135,864. By means of the methods disclosed in said application, I have been able to increase the recovery of nitrogen compounds from 87 per cent to between 90 and 93 per cent of the nitrogen compounds used in the manufacture of sulfuric acid.

I have now perfected further refinements in the process, which enable me to secure a recovery of between 93 and 99 per cent of the nitrogen oxides used. Such refinements include the following steps, as applied to the residual gases of a gas mixture undergoing treatment for the recovery of nitrogen oxides, after such gas mixture has been treated with nitric acid, either followed or not followed with a treatment with sulfuric acid:

(a) Treatment with water, or aqueous liquid.

(b) Treatment with a hydroxide, a carbonate or a bicarbonate, or any basic compound.

(c) Treatment with water or aqueous liquid, followed by treatment with a hydroxide, a carbonate or a bicarbonate, or any basic compound.

Previous investigators have proposed the use of hydroxides or carbonates or bicarbonates for the absorption of nitrogen oxides from sulfuric acid chamber exit gases, but none of these proposals has been adopted because of the expense, due to the large consumption of reagents in the neutralization of sulfur dioxide and entrained mists of sulfuric acid contained in the chamber exit gases of nitration-processes as usually practiced, with formation of unsalable sulfites and sulfates. My previous inventions of oxidizing the residual $SO_2$ from the gases and then treating the gases with water remove both the $SO_2$ and the entrained sulfuric acid mists, and I have now discovered that by using these two steps as preliminaries, I can economically complete the absorption of nitrogen oxides with hydroxides, carbonates or bicarbonates, such as lime, caustic soda, carbonate or bicarbonate of soda, or soda ash, either in solution or in solid or powdered or granular form, or in suspension in a liquid as a slurry or so-called "milk."

In effecting the recovery of nitrogen oxides from the gases of a sulfuric acid plant with various treatments and with various absorbing agents, naturally there are a variety of sequences in which the treatments or agents may be applied. It is unnecessary as well as impracticable to enumerate here all possible sequences, but I mention below several, as illustrations. In these illustrations, the word "treatment" is to be understood as an abbreviation for and as implying the following expression printed in italics: *treatment of a gas mixture containing nitrogen-oxygen compounds, on its way through apparatus for the recovery of such compounds.*

*Illustration I.*—Treatment with: first, nitric acid, or nitric acid and water; second, sulfuric acid of above 55° Bé.; third, water.

*Illustration II.*—Treatment with: first, sulfuric acid of above 55° Bé.; second nitric acid, or nitric acid and water; third, sulfuric acid of above 55° Bé.; fourth, water.

*Illustration III.*—Treatment with: first, nitric acid, or nitric acid and water; second, sulfuric acid of above 55° Bé.; third, water; fourth, a hydroxide, a carbonate or a bicarbonate.

*Illustration IV.*—Treatment with: first, sulfuric acid of above 55° Bé.; second, nitric acid or nitric acid and water; third, sulfuric acid of above 55° Bé.; fourth, water; fifth, a hydroxide, a carbonate or a bicarbonate.

*Illustration V.*—Treatment with: first, sulfuric acid of above 55° Bé.; second nitric acid or nitric acid and water; third, water.

*Illustration VI.*—Treatment with: first, sulfuric acid of above 55° Bé.; second, nitric acid or nitric acid and water; third, a hydroxide, a carbonate or a bicarbonate.

*Illustration VII.*—Treatment with: first, sulfuric acid of above 55° Bé.; second, nitric acid or nitric acid and water; third, water; fourth, a hydroxide, a carbonate or a bicarbonate.

In each one of these seven illustrations except Illustration VI, there is specified a treatment with nitric acid, whose purpose is to effect the oxidation of the residual sulfur dioxide in the gas mixture, and later a treatment with water, to effect the removal of acid residues or to absorb a part of the nitrogen-oxygen compounds, or both; and the water treatment is invariably preceded (although not necessarily immediately) by the nitric acid treatment. In Illustration VI there is specified a treatment with nitric acid, for the above-named purpose, and later, a treatment with a hydroxide, carbonate or bicarbonate, to effect the absorption of residual nitrogen-oxygen compounds. In Illustrations III, IV and VII there is specified a treatment with nitric acid to oxidize sulfur dioxide, later a treatment with water to remove acid residues, and finally a treatment with a hydroxide, carbonate or bicarbonate to absorb residual oxides of nitrogen. A treatment with sulfuric acid of above 55° Bé. is also mentioned, in every one of the seven illustrations, and the sulfuric treatment is in some illustrations before the nitric treatment, and in others, after the nitric treatment. Whether the nitric acid treatment should come before or after the sulfuric treatment depends upon whether my process is applied (1), to chamber-exit gases (i. e., to gases immediately after their discharge from the last chamber, or its technical equivalent, of a sulfuric acid plant), or (2), to Gay-Lussac tower exit gases. In Illustrations I and III, my process is applied to chamber-exit gases. In Illustrations II and IV, my process is applied partly to gases intermediate between two Gay-Lussac towers connected in series, and partly to the residual gases after their discharge from the final Gay-Lussac tower. In Illustrations V, VI and VII my process is applied to residual sulfuric acid-plant gases after discharge from the final Gay-Lussac tower of a series of such towers.

As applied to chamber-exit gases, my process comprises preferably the sequence of steps, applied successively to the same body of mixed gases, enumerated in Illustration III, namely:

1. Treatment with nitric acid to oxidize residual sulfur dioxide.
2. Treatment with sulfuric acid of above 55° Bé. to absorb the bulk of the nitrogen oxides.
3. Treatment with water to remove acid residues.
4. Treatment with the hydroxide, carbonate or bicarbonate of a base to absorb residual nitrogen oxides.

As applied to gases intermediate between two Gay-Lussac towers in series, my process comprises preferably the sequence of steps enumerated in Illustration IV, applied to the same body of mixed gases.

As applied to gases discharged from the final Gay-Lussac tower of a series of such towers (or from the Gay-Lussac tower if there be only one), my process comprises preferably the sequence of steps, applied successively to the same body of mixed gases, enumerated in Illustration VII, namely:

1. Treatment with sulfuric acid of above 55° Bé. in one or more Gay-Lussac towers, to absorb the bulk of the nitrogen oxides.
2. Treatment with nitric acid to oxidize residual sulfur dioxide.
3. Treatment with water to remove acid residues prior to the final treatment.
4. Treatment with the hydroxide, carbonate or bicarbonate of a base to absorb residual nitrogen oxides.

In any sequence of treatments, it should be understood that a treatment with water means water plus any sulfuric or nitrogen compounds absorbed in the water during the treatment, the only extraneous substance added, in the "water" treatment, being water.

In any sequence of treatments the nitric acid and the sulfuric acid treatments may be performed at one operation and in the same apparatus, by mixing nitric acid with sulfuric acid of above 55° Bé.

It should be understood that in any treatment of a gas mixture containing $SO_2$ with nitric acid, or with nitric acid and water, sulfuric acid will be formed and dissolved in the liquid, so that the liquid, after contact with such gas, will be a mixture of nitric and dilute sulfuric acids.

In any of the aforesaid treatments, the absorbing or reacting agent may be contacted in cyclical or recirculated fashion, but the latter is preferred. A portion of the absorbing agents may be withdrawn, either intermittently or continuously, and used for the manufacture of sulfuric acid by introduction into the Glover tower or any other part of a sulfuric acid plant, as a stream of liquid, or as a spray or mist. Or, if preferred, such withdrawn portions of absorbing agent containing absorbed oxides of nitrogen may be used for other purposes. In the nitric acid treatments in lieu of nitric acid, a nitrate or solution of a nitrate may be used, since, in the nitric acid treatment, whenever sulfuric acid is automatically formed by the oxidation of $SO_2$, such sulfuric acid readily reacts with a nitrate to form nitric acid.

The manner of contacting the reacting or absorbing agent with the gas is not restricted. The contacting may be done in a packed tower, an empty chamber, or in a bubbling device, and forcible contact of gas with liquid may be secured with a mechanical agitator or with a spraying or atomizing device.

While I have specifically mentioned the removal of entrained mists or droplets of sulfuric acid from the gas mixture by treatment with water, obviously the entrained sulfuric acid might be removed by other means, as by treatment with some other absorbent, or by conducting the gases through a long duct or large chamber, or through a packed tower or through some filtering medium or through an electrical mist precipitator of the Cottrell type, all such means being within the scope of this invention.

I claim:

1. In a process for substantially completely separating nitrogen-oxygen compounds from a gas mixture discharged from a sulfuric acid manufacturing apparatus and containing said nitrogen compounds and also sulfuric acid mist and a residuum of sulfur dioxide, the steps of substantially completely oxidizing such sulfur dioxide by means of nitric acid, thereof removing such sulfuric acid mist by means of an absorbent for the latter and thereafter contacting said gas mixture with a solution containing a base, substantially as herein described.

2. The process of separating nitrogen-oxygen compounds from a gas mixture discharged from the acid-manufacturing part of a sulfuric acid plant, comprising the steps of treating said gas mixture with sulfuric acid of a strength greater than 70 per cent. $H_2SO_4$ for effecting the absorption of part of said nitrogen-oxygen compounds, thereafter treating the residual gases of said gas mixture with a water-nitric acid mixture for effecting the oxidation of residual sulfur dioxide, and thereafter, as a final step, treating the remaining gases of said gas mixture with water.

3. The process of separating nitrogen-oxygen compounds from a gas mixture discharged from the acid-manufacturing part of a sulfuric acid plant, comprising the steps of treating said gas mixture with sulfuric acid of a strength greater than 70 per cent. $H_2SO_4$ for effecting the absorption of part of said nitrogen-oxygen compounds, thereafter treating the residual gases of said gas mixture with aqueous liquid containing nitric acid for effecting the oxidation of residual sulfur dioxide, and thereafter, as a final step, treating the resultant gases with a basic compound.

4. In a process for separating nitrogen-oxygen compounds from a gas mixture discharged from the acid-manufacturing part of a sulfuric acid plant, the steps of treating said gas mixture with a sulfuric acid solution containing more than 70 per cent. $H_2SO_4$ for effecting the absorption of part of said nitrogen-oxygen compounds, thereafter treating the residual gases of said gas mixture with an aqueous liquid containing nitric acid to effect the oxidation of residual sulfur dioxide, thereafter, as the step next to the last one, treating the resultant gases of said gas mixture with aqueous liquid to remove acid residues, and thereafter, as the final step, treating the de-acidified gases of said gas mixture with a basic compound for effecting the absorption of residual nitrogen-oxygen compounds.

5. In a process for separating nitrogen-oxygen compounds from a gas mixture containing the same and also some sulfur dioxide, but less than 0.2 per cent, by volume of the latter, the steps of treating said gas mixture with sulfuric acid solution containing more than 70 per cent. $H_2SO_4$ for effecting the absorption of a part of said nitrogen-oxygen compounds, thereafter treating the residue of said gas mixture with a water-nitric acid mixture to effect the oxidation of said sulfur dioxide, and thereafter, as a final step, treating said oxidized gas mixture with water.

6. In a process for separating nitrogen-oxygen compounds from a gas mixture containing the same and also sulfur dioxide, but less than 0.2 per cent. by volume of the latter, the steps of treating said gas mixture with aqueous liquid containing nitric acid for effecting the oxidation of substantially all of said sulfur dioxide, thereafter treating the resultant gases of said gas mixture with sulfuric acid solution containing more than 70 per cent. $H_2SO_4$ for effecting the absorption of a part of said nitrogen oxides, thereafter treating the residual gases of said gas mixture with water for the removal of acid residues, and thereafter, as a final step, treating the washed gases of said gas mixture with a basic compound, for effecting the absorption of residual nitrogen-oxygen compounds.

7. In the manufacture of sulfuric acid by a nitration process, a process for separating nitrogen-oxygen compounds from a gas mixture containing the same, comprising the steps of treating said gas mixture with a sulfuric acid solution containing more than 70 per cent. $H_2SO_4$ for effecting the absorption of the bulk of said nitrogen-oxygen compounds, thereafter treating the residual gases of said gas mixture with an aqueous liquid containing nitric acid, and thereafter, as a final step, treating the resultant gases of said gas mixture with an aqueous liquid containing a base for effecting the absorption of residual nitrogen-oxygen compounds.

8. In the manufacture of sulfuric acid by means of nitrogen-oxygen compounds, a process for separating nitrogen-oxygen compounds from a gas mixture containing the same and also sulfur dioxide, but less than 0.2 per cent. by volume of the latter, comprising the steps of treating said gas mixture with sulfuric acid solution containing more than 70 per cent. $H_2SO_4$ for effecting the absorption of a part of said nitrogen-oxygen compounds, thereafter treating the residual gases of said gas mixture with a water-nitric acid mixture to effect the oxidation of said sulfur dioxide, thereafter treating the resultant gases of said gas mixture with a liquid capable of absorbing sulfuric acid mist for the removal of acid residues, and thereafter, as a final step, treating the washed gases of said gas mixture with a solution of a base.

9. In a process for separating nitrogen-oxygen compounds from sulfuric acid plant gases containing the same and containing less than 0.2 per cent. by volume of sulfur dioxide, the steps of treating said gases with sulfuric acid solution containing more than 70 per cent. $H_2SO_4$, thereafter treating the residual gases with nitric acid to effect the substantially complete oxidation of said sulfur dioxide, thereafter passing the resultant gases through a filtering medium to remove acid residues, and thereafter, as a final step, treating said filtered gases with a basic compound to effect the absorption of residual nitrogen-oxygen compounds.

10. A process for substantially separating nitrogen-oxygen compounds from a gas mixture containing the same and containing also sulfur dioxide, but less than 0.2 per cent. by volume of the latter, and containing also entrained drops of sulfuric acid, said process comprising the following steps: (1) treating said gas mixture with sulfuric acid solution containing more than 70 per cent. $H_2SO_4$ to effect the absorption of a part of said nitrogen-oxygen compounds; (2) thereafter treating the residual gases with nitric acid to effect the oxidation of substantially all of said sulfur dioxide; (3) thereafter conducting the resultant gases of said gas mixture through a mist-separating chamber to effect the separation from said gas mixture of said sulfuric acid drops; and (4) thereafter, as a final step, treating the purified gases of said gas mixture with a solution containing a base to effect the absorption of residual nitrogen-oxygen compounds.

11. A process for substantially completely separating nitrogen-oxygen compounds from the gas mixture discharged from a Gay-Lussac tower of a sulfuric acid plant, comprising the steps of treating said gas mixture with nitric acid solution, thereafter washing said gas mixture with aqueous liquid, and thereafter, as a final step, treating said washed gas mixture with a solution containing a base.

12. A process for substantially completely separating nitrogen-oxygen compounds from the gas mixture discharged from a Gay-Lussac tower of a sulfuric acid plant, comprising the steps of treating said gas mixture with nitric acid, and thereafter, as a final step, with a solution of a base.

13. A process for substantially completely separating nitrogen-oxygen compounds from the gas mixture discharged from a Gay-Lussac tower of a sulfuric acid plant, comprising the steps of treating said gas mixture with nitric acid, thereafter with sulfuric acid containing more than 70 per cent. $H_2SO_4$, and thereafter with aqueous liquid.

14. A process for substantially completely separating nitrogen-oxygen compounds from the gas mixture discharged from a Gay-Lussac tower of a sulfuric acid plant, comprising the steps of treating said gas mixture with nitric acid, thereafter with sulfuric acid containing more than 70 per cent. $H_2SO_4$, thereafter with aqueous liquid, and thereafter, as a final step, with a solution containing a base.

ANDREW M. FAIRLIE.

CERTIFICATE OF CORRECTION

Patent No. 1,912,833.                                  June 6, 1933.

ANDREW MILLER FAIRLIE.

It is hereby certified that error appears in the printed specification of the above numbered patent requiring correction as follows: Page 3, first column, line 46, claim 1, for the word "thereof" read thereafter; and that the said Letters Patent should be read with this correction therein that the same may conform to the record of the case in the Patent Office.

Signed and sealed this 28th day of June, A. D. 1938.

Henry Van Arsdale,
Acting Commissioner of Patents.

(Seal)